Nov. 7, 1950  H. F. STORM  2,528,798
CONTROL ARRANGEMENT FOR A HIGH-FREQUENCY HEATING DEVICE
Filed March 7, 1946  3 Sheets-Sheet 1
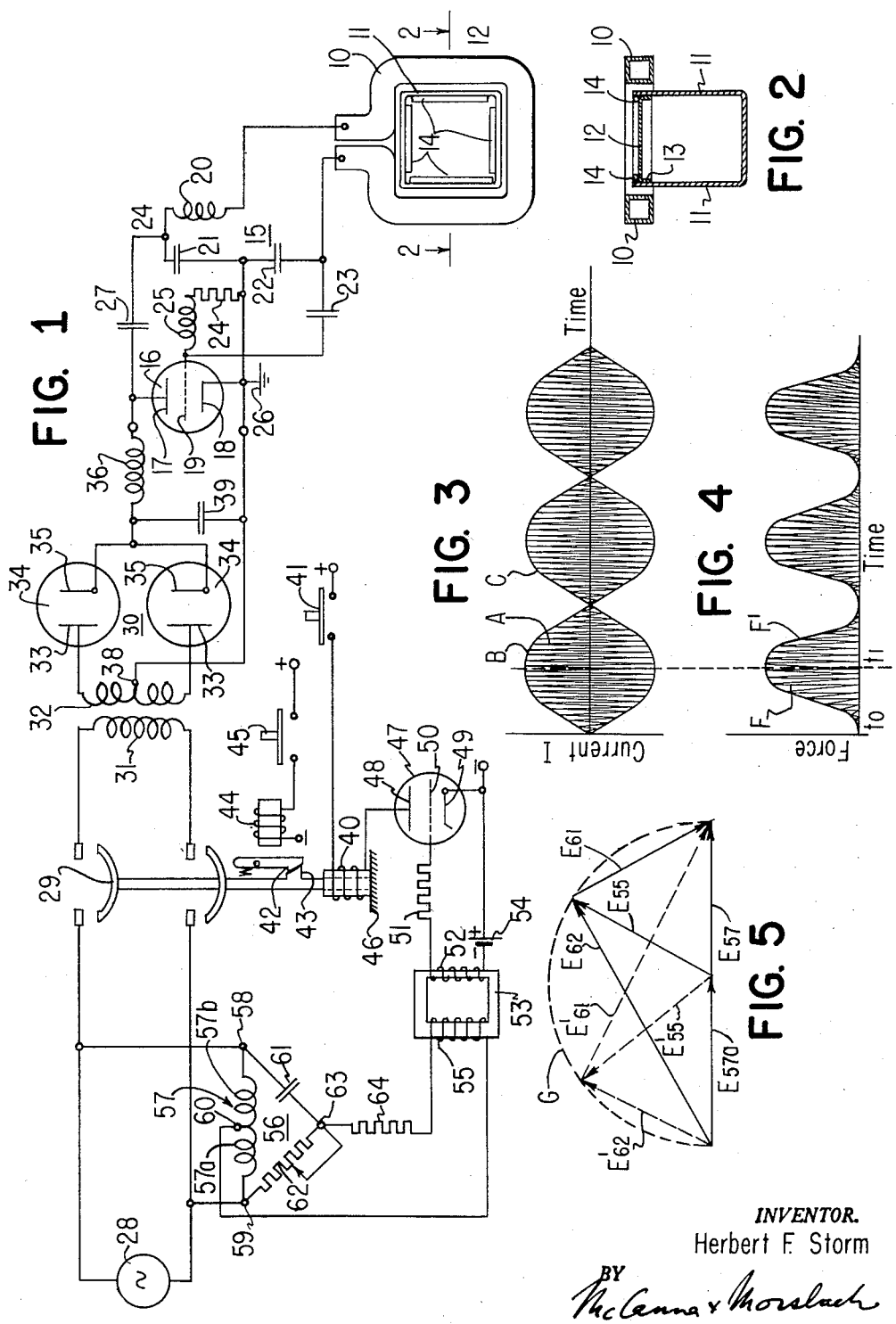
INVENTOR.
Herbert F. Storm
BY
McCanna & Morsbach
Attorneys Nov. 7, 1950          H. F. STORM          2,528,798
CONTROL ARRANGEMENT FOR A HIGH-FREQUENCY HEATING DEVICE
Filed March 7, 1946          3 Sheets-Sheet 2
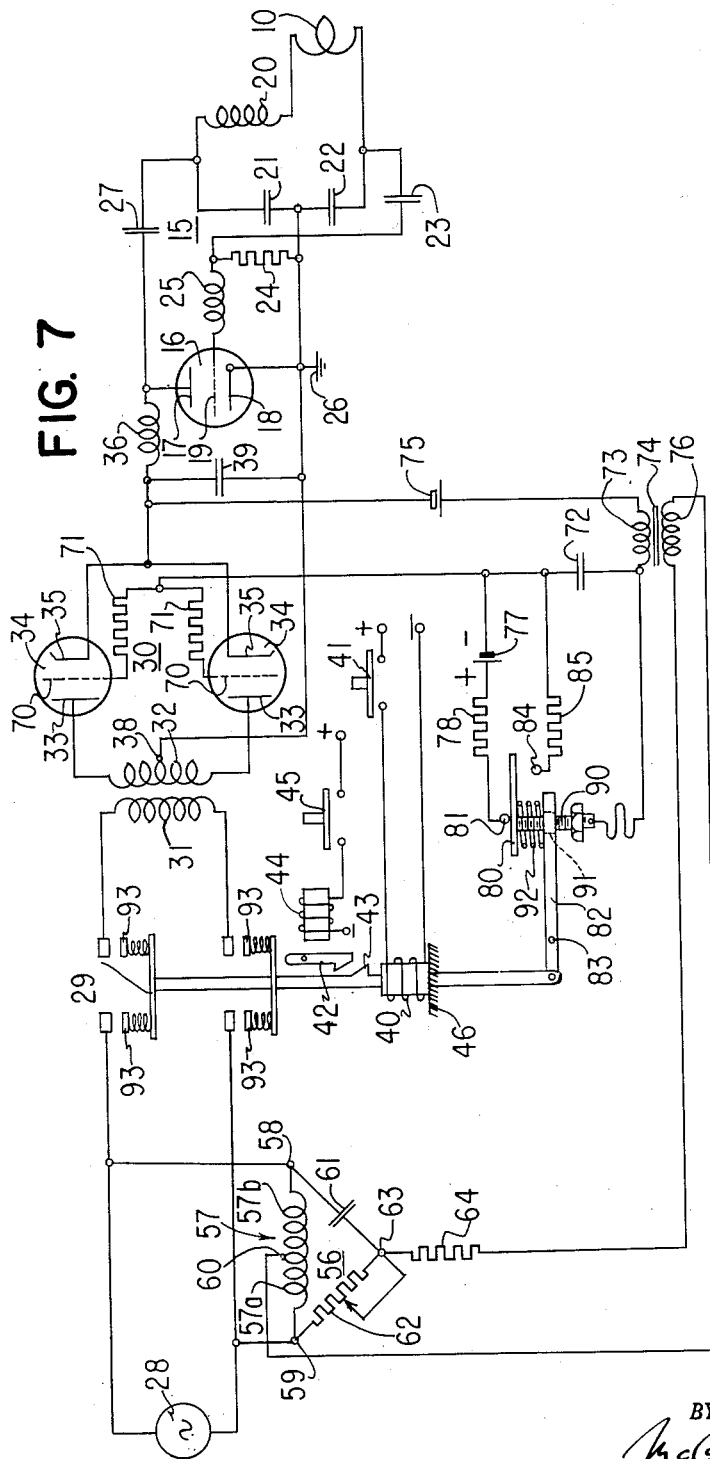
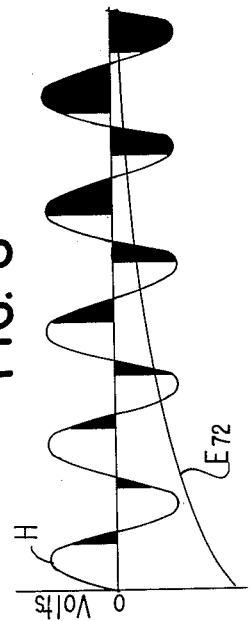
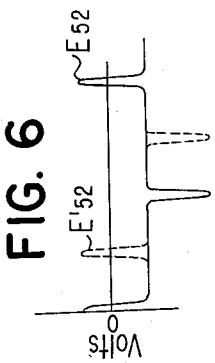
*INVENTOR.*
Herbert F. Storm
BY
Attorneys Nov. 7, 1950     H. F. STORM     2,528,798
CONTROL ARRANGEMENT FOR A HIGH-FREQUENCY HEATING DEVICE
Filed March 7, 1946     3 Sheets-Sheet 3
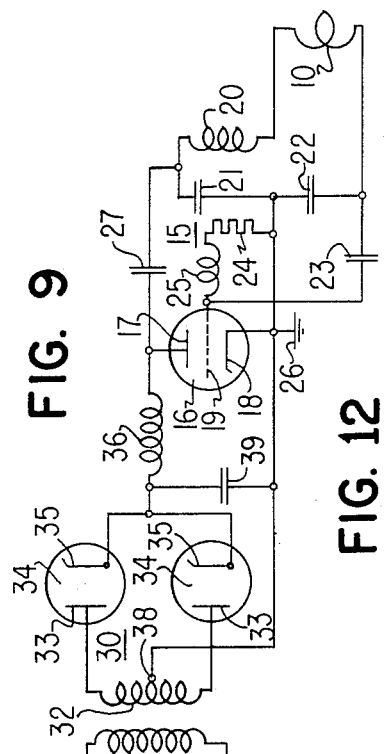
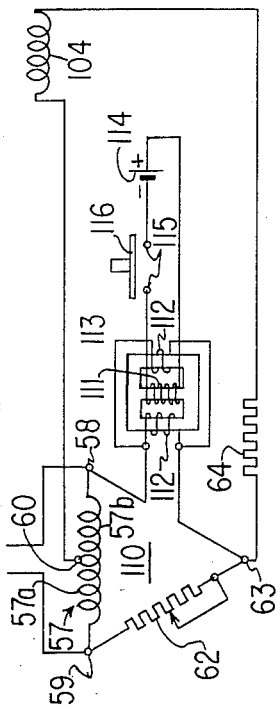
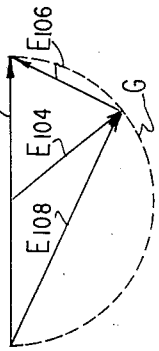
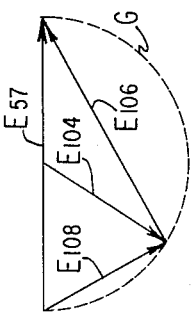
INVENTOR.
Herbert F. Storm
BY
*McCanna & Morslach*
Attorneys Patented Nov. 7, 1950

2,528,798

UNITED STATES PATENT OFFICE 2,528,798

CONTROL ARRANGEMENT FOR A HIGH-FREQUENCY HEATING DEVICE

Herbert F. Storm, Milwaukee, Wis., assignor to Sunbeam Corporation, a corporation of Illinois Application March 7, 1946, Serial No. 652,756

16 Claims. (Cl. 219—47)

The present invention relates to a control arrangement for a high frequency heating device and more particularly to a control arrangement for a high frequency heating device of the type used for soldering two metal members together.

Induction heating devices are in extensive use today in many manufacturing operations. In connection with the manufacturing of many mass production items it is common practice to solder two metal members together by means of an induction heating device. In such a case the metal members are placed within an inductor or heating coil and the high frequency oscillations produced in the heating coil are induced by transformer action in lengths of solder strategically placed with relation to the members to be soldered so as to flow into the joint between these members. In the manufacture of capacitors, for example, it is common practice to solder the cover of the capacitor can or container to the can by a high frequency heating process. The cover is placed in position on the can and lengths of solder are placed adjacent the joint to be soldered. Currents induced in these lengths of solder cause the desired heating effect and the beneficial soldering operation.

It is well-known that dynamic forces exist between two substantially parallel closely positioned conductors through which electric currents flow. The dynamic forces are attractive with respect to the two conductors when the direction of current flow is the same in both conductors and the forces are repellent when the current flow is opposite in both conductors. In the case of induction heating devices of the type described above, the current flow in the inductor and the current flow in the solder lengths to be melted by the induction heating device are essentially of opposite sign and therefore repulsive forces exist between the inductor or heating coil and the lengths of solder. These repulsive forces may be particularly undesirable when the current is suddenly applied and in such a case the lengths of solder may actually be pushed completely out of position so that the solder is prevented from being properly melted and then caused to flow into the joint in the manner desired.

It is an object of the present invention to provide a new and improved control arrangement for high frequency heating devices of the type employed for soldering two metal members together whereby the undesirable result mentioned above is completely eliminated.

It is another object of the present invention to provide a new and improved control arrangement for a high frequency heating device in which the initial currents permitted to flow in the inductor or heating coil upon energizing the heating device have a low value and gradually build up to the desired value for proper heating.

Still another object of the present invention is to provide a new and improved arrangement for a high frequency heating device in which automatic means are provided to insure that the current flowing in the heating coil starts at a low value and gradually increases to the desired value.

It is a further object of the present invention to provide a high frequency heating device of the type for soldering two metal members by providing a control device which may be operated only at a predetermined time with reference to the instantaneous value of the current flowing in the alternating current source for the high frequency heating device.

Another object of the present invention is to provide a control arrangement for a high frequency heating device of the type for soldering two metal members together including a phase shifting device which automatically controls the magnitude of the direct current supplied to the oscillation generator supplying the high frequency heating device.

Still another object of the present invention is the provision of a control arrangement for a high frequency heating device of the type for soldering two metal members together which employs a variable impedance to control the current flowing in the heating coil upon initiating of the heating operation.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings, in which:

Fig. 1 is a partly schematic diagram illustrating a high frequency heating device and a control arrangement therefor embodying the present invention;

Fig. 2 is a sectional view taken on line 2—2 of Fig. 1;

Figs. 3 and 4 are curve diagrams to aid in understanding the operation of the control arrangement disclosed in Fig. 1;

Fig. 5 is a vector diagram to aid in understand-

Fig. 1;

Fig. 6 is a curve diagram to aid in understanding the operation of the control arrangement of Fig. 1;

Fig. 7 is a schematic diagram somewhat similar to Fig. 1 illustrating a modification of the present invention;

Fig. 8 is a curve diagram to aid in understanding the operation of the control arrangement of Fig. 7;

Fig. 9 is a schematic diagram somewhat similar to Figs. 1 and 7 illustrating still another modification of the present invention;

Figs. 10 and 11 are vector diagrams to aid in understanding the operation of the control arrangement of Fig. 9;

Fig. 12 is a partial view of the arrangement disclosed in Fig. 9 showing still another modification of the present invention.

Referring now to Fig. 1 of the drawing there is illustrated an induction heating coil or inductor 10 which is essentially a pipe so that it can readily be water-cooled if desired. Heating coil 10 is illustrated as having a rectangular configuration so that it may be utilized to perform a heating function on a rectangular work piece. It should be understood, however, that the particular shape of the heating coil is immaterial as far as the present invention is concerned. Heating coil 10 is adapted to surround a work piece illustrated as a metal container 11 which may for example, form the can or casing for a capacitor. Container 11 is adapted to be closed by a suitable cover 12 which is illustrated as having a circumferential flange 13 which fits tightly within container 11. Cover 12 is pressed tightly into container or can 11 to the desired depth so that the can and cover are positioned in the manner indicated in Figs. 1 and 2 within inductor or heating coil 10. In order to solder cover 12 to container 11, lengths of a suitable solder indicated at 14 are placed along the joint between container 11 and cover 12 as is clearly indicated in Figs. 1 and 2. It will be obvious that as soon as the inductor or high frequency heating coil 10 is energized, with a suitable high frequency current, melting of solder 14 results. As soon as the desired flow of the solder is obtained, the power source is disconnected from heating coil 10 so that the solder may solidify to complete the joint.

While the lengths of solder 14 are being heated inductively, the solder carries current which has a component opposite in phase to the high frequency current flowing in inductor 10. The lengths of solder 14 are consequently repelled by the force produced by virtue of current flowing in opposite directions in two adjacent conductors. This repulsive force when applied suddenly may jolt or push the solder away from the joint so that it cannot be properly melted and caused to flow into the joint as desired.

The theory underlying the repulsive jolt of solder lengths 13 can best be understood by an examination of the curve diagrams of Figs. 3 and 4. The curve A of Fig. 3 bounded by the sinusoidal envelopes B and C represents the high frequency current flowing in high frequency coil or inductor 10. It will be obvious that a similar current will flow in the lengths of solder 14 although this current will be of opposite sign. Since the repulsive force which is produced by virtue of the currents flowing in opposite directions in two adjacent conductors is proportional to the product of these two currents, it will in the case of the current represented by the curve A of Fig. 3 follow an envelope which is as a first approximation, a sine squared function as shown by the curve F of Fig. 4, having an envelope F'. An inspection of Fig. 4 which illustrates the repulsive forces indicates that wide variations of force occur. This repulsive force may be zero at the instant of time marked $t_0$ in Fig. 4 and reaches a maximum value at the time marked $t_1$. It will be obvious that if the heating coil 10 is energized at the instant corresponding to the time $t_0$ in Fig. 4, the repulsion force builds up gradually and no undesirable moving of the solder lengths 14 will result. On the other hand, if the heating coil 10 is energized at the instant corresponding to the time $t_1$ in Fig. 4 the repulsion forces are built up rapidly and a jolt and possible displacement of the solder lengths 14 results, with the consequent unsatisfactory soldering operation. Since such induction heating devices are used for the mass production of certain items, it is obvious that such movement of the solder should never result and there are disclosed hereinafter several arrangements for insuring that such movement of the solder does not occur regardless of how or when the high frequency heating coil 10 is energized.

In order to energize heating coil 10 with high frequency current there is illustrated in Fig. 1 an oscillation generator generally indicated at 15. Oscillator generator 15 may comprise any standard form of generator for producing high frequency oscillations. In Fig. 1 this generator has been illustrated as comprising the wellknown Colpitts oscillator including an electric discharge valve 16 having an anode or plate 17, a cathode 18 and a control electrode or grid 19. The oscillating action of discharge valve 16 is controlled by a tuned or resonant circuit generally referred to as a tank circuit comprising serially arranged inductance 20 and heating coil 10, connected in parallel with serially arranged capacitors 21 and 22. The cathode 18 of discharge valve 16 is connected to a point on the tank circuit between capacitors 21 and 22 which act as a voltage divider. The lower terminal of the tank circuit is connected to control electrode 19 through a grid blocking capacitor 23. A grid leak circuit is provided between control electrode 19 and cathode 18 which comprises a resistor 24 and an inductance 25. Preferably cathode 18 is grounded as indicated at 26. The upper terminal of the tank circuit is connected to anode 17 through plate blocking condenser 27 in order to insulate the anode 17 from control electrode 19, insofar as the direct current potential applied to the anode cathode circuit of electric discharge valve 16 to be described hereinafter, is concerned, while still maintaining anode 17 and the upper terminal of the tank circuit at the same high frequency potential.

A source of direct current potential is applied across the anode cathode circuit which will be referred to as the input of the oscillation generator 15. In order to perform certain control functions which will become apparent as the following description proceeds, this source of direct current potential is obtained from any ordinary 60 cycle alternating current source such as indicated at 28 in Fig. 1. Source 28 is connected through a suitable control device illustrated as an electric circuit breaker or contactor 29, to a suitable rectifier unit 30 in order to convert the alternating current to the direct current required at the input terminals of the oscillation generator 15. Rectifier unit 30 is illustrated as a biphase rectifier comprising a rectifier transformer having a primary winding 31 connected to source 28 through circuit breaker or contactor 29 and a secondary winding 32 having its outside terminals connected to the anodes 33 of a pair of rectifier tubes 34. The cathodes 35 of the rectifier tubes 34 are connected together and in turn connected through a suitable choke coil 36 to one input terminal of the oscillation generator 15. The midpoint 38 of the secondary winding 32 of the rectifier transformer is connected to the other input terminal of oscillation generator 15. A suitable by-pass condenser 39 may be provided to by-pass the high frequency oscillations and with choke coil 36 to impede the passage of high-frequency power into the rectifier.

Circuit breaker or contactor 29 is illustrated as the double pole type and is shown in the open position in Fig. 1. This circuit breaker has been illustrated as of the latched closed type which is normally biased to the open position either by gravity or by suitable spring means not shown. A circuit breaker closing winding 40 is provided which may be energized by the closing of a suitable closing control switch 41 to move the circuit breaker 29 to the closed position. When moved to the closed position, a suitable latch 42 is biased into latching engagement with a member 43 associated with circuit breaker 29, to maintain circuit breaker 29 in the closed position. A trip coil 44 is provided which may be energized from a suitable source of potential upon closure of tripping or circuit breaker opening switch 45, whereupon latch 42 is moved to release circuit breaker 29 and permit it to move to the open position, under the action of gravity or suitable spring means not shown. Opening movement of circuit breaker 29 is limited by a suitable stop 46. The arrangement described thus far is a conventional control arrangement for a high frequency heating circuit. Without more, the control arrangement may function to perform the soldering operation desired but as was pointed out above, if the circuit breaker 29 is closed at the wrong time, a jolt and even movement of solder lengths 14 out of position may occur with a resulting ineffectual soldering operation.

In order to eliminate the repulsion jolt effect referred to above, the closing coil 40 of circuit breaker or contactor 29 is controlled in a predetermined manner whenever closing switch 41 is operated. In accordance with the present invention, therefore, an electric discharge valve 47 is provided which is connected in series with closing coil 40 and closing switch 41 of circuit breaker 29. Electric discharge valve 47 is preferably an electronic tube of the gas or vapor filled type, such as a thyratron and comprises an anode 48, a cathode 49 and a grid or control electrode 50. The anode 48 is illustrated as being connected directly to one terminal of the closing coil 40 while the cathode 49 is connected to one terminal of a source of control potential. The other terminal of the source of control potential is connected to the other terminal of closing coil 40 through circuit breaker closing switch 41.

The control electrode or grid 50 of electric discharge valve 47 is connected to the cathode 49 through a grid control circuit comprising a current limiting resistor 51, the secondary winding 52 of a peaking transformer 53 and a bias battery 54. Bias battery 54 maintains the control electrode 50 at a negative potential relative to the cathode 29 and in other words, maintains the electric discharge valve 47 in a non-conducting condition, when no induced potential exists across winding 52 of peaking transformer 53. Electric discharge valve 47 may be rendered conductive in response to a peaked voltage which is supplied thereto by means of peaking transformer 53 whose primary winding 55 is energized from alternating current source 28 through a suitable phase shifting device generally indicated at 56.

The construction of phase shifting device 56 forms no part of the present invention and may comprise any conventional phase shifting device. For the purpose of illustrating the invention, however, phase shifting device 56 is shown in Fig. 1 as of the type disclosed in Alexanderson Patent No. 1,719,866, including a winding 57 connected across potential source 28. Winding 57 is provided with end taps 58 and 59 and a mid tap 60. The portion of winding 57 between taps 59 and 60 is designated as 57a while the portion between taps 58 and 60 is designated as 57b. A bridge circuit is defined with two of the legs comprising winding portions 57a and 57b while the other two legs comprise a capacitor 61 and an adjustable resistor 62 which latter two legs are connected together at a junction point or terminal 63. Resistor 62 is connected between terminals 59 and 63 while capacitor 61 is connected between terminals 58 and 63. Terminals 60 and 63 provide the output terminals for the bridge circuit of phase shifting device 56 and are connected across primary winding 55 of peaking transformer 53 through a suitable resistor 64.

The operation of the phase shifting circuit 56 will be obvious by an examination of the vector diagram of Fig. 5 showing the voltages appearing across the legs of the bridge circuit of the phase shifting device 56. The vector $E_{57}$ represents the instantaneous voltage of source 28 which appears across winding 57 and consequently half of this voltage appears across each of the winding portions 57a and 57b, respectively. Similarly the vectors $E_{62}$ and $E_{61}$ which are displaced by 90 electrical degrees represent the instantaneous voltages across resistor 62 and capacitor 61, respectively, for one resistance setting of resistor 62. The vector $E_{55}$ on the other hand is the output voltage obtained across terminals 60 and 63 or the voltage across the primary winding 55 of peaking transformer 53 for this one resistance setting of resistor 62. It will be obvious that by varying the resistance of resistor 62 a variation in the voltages across resistor 62 and capacitor 61 can be obtained, these voltage vectors being always at right angles and the junction point between the vectors appearing along the dashed half circle G in Fig. 5. The vectors $E'_{61}$, $E'_{62}$ and $E'_{55}$ represent the same instantaneous voltages for a different setting of resistor 62. With this arrangement the phase of the voltage $E_{55}$ appearing across the primary winding 55 of the peaking transformer 53, may vary widely through an angle of substantially 180° from a value in phase with the voltage $E_{57}$ which is the most advanced phase position to more and more retarded phase positions relative to the voltage $E_{57}$.

Fig. 6 illustrates the output voltage of peaking transformer 53 which is represented by the curve $E_{52}$, thus indicating the instantaneous voltage across winding 52 when the voltage across winding 55 is represented by vector $E_{55}$ of Fig. 5. The peaks of curve $E_{52}$ are displaced from the zero voltage axis by an amount which corresponds to the voltage of the bias battery 54. By varying the setting of resistor 62 as by decreasing the resistance so the instantaneous voltage across the resistor is represented by $E'_{62}$ of Fig. 5, the output voltage of peaking transformer 53 is retarded as indicated by the curve $E'_{52}$ of Fig. 6. It will be understood that electric discharge valve 47 is rendered effective to conduct current whenever a positive peak of voltage appears across the grid circuit of electric discharge valve 47. It will be obvious, therefore, that even though closing switch 41 is closed, circuit breaker 29 will not be moved to the closed position until electric discharge valve 47 is simultaneously rendered conductive. By properly adjusting the resistance valve of resistor 62, electric discharge valve 47 may be rendered conductive to close circuit breaker 29 at a particular instant during the alternating current cycle of the voltage of alternating current source 28 which corresponds to the point of zero repulsive force between heating coil 10 and lengths of solder 14, whereby a jolt and perhaps even movement of solder 14 is substantially eliminated. To accomplish this it will be understood that circuit breaker or contactor 29 is one which has a constant time of response and the control of the energization of closing coil 49 thereof will depend upon this time of response. The essential feature is that circuit breaker 29 is actually closed to complete the energization circuit for oscillation generator 15 at the instant of zero repulsive force. With this arrangement the phase shifting unit 56 can be adjusted so that substantially no repulsion jolt will be exerted on the lengths of solder 14.

In view of the detailed description included above the operation of the control arrangement of Fig. 1 will be obvious and no further discussion thereof is included in this specification.

It may be desirable under certain conditions to provide a control arrangement which eliminates the repulsion jolt effect described above by employing a circuit breaker or contactor which does not necessarily have a constant time of response. In Fig. 7 there is illustrated a modification of the present invention which does not require the use of a circuit breaker having a substantially constant time of response. The corresponding parts of Fig. 7 are designated by the same reference numerals as in Fig. 1. In accordance with the arrangement disclosed in Fig. 7, the direct current voltage supplied to the oscillation generator 15 always has a relatively small value at the instant the oscillation generator is first energized. This is accomplished by employing the control arrangement to be described hereinafter.

In the arrangement disclosed in Fig. 7, the rectifier tubes 34 are each provided with control electrodes 70 and a current limiting resistor 71. The grids or control electrodes 70 are connected in parallel and the grid to cathode circuit for discharge valves 34 includes a serially arranged capacitor 72, the secondary winding 73 of a grid transformer 74, and a bias battery 75. The primary winding 76 of grid transformer 74 is connected across the output terminals 60 and 63 of phase shifting unit 56. With this arrangement it will be observed that the point at which rectifier tubes 34 are rendered conductive may be varied in dependence upon the adjustment of resistor 62 of phase shifting circuit 56. Preferably rectifiers 34 are of the type employing an ionizable medium which, when once rendered conducting, remain conducting until the plate voltage is removed.

In accordance with the present invention there is superimposed upon the grid to cathode voltage obtained from transformer 74 and the voltage of bias battery 75 a voltage from a battery 77 which is serially arranged in a circuit which includes a current limiting resistor 78, the capacitor 72 and a switch 80 which normally engages a stationary contact 81 when the circuit breaker 29 is in the open position. Capacitor 72 which is as mentioned above both in the grid to cathode circuits of electric discharge valves 34 and also in the series circuit with battery 77 provides a convenient means for superimposing the voltage of battery 77 on the control electrodes or grids 70. When the circuit breaker 29 is in the open position and switch 80 engages contact 81, battery 77 charges capacitor 72 in a manner so that a negative polarity appears at grids 70, thereby biasing electric discharge valves 34 in a manner so that they will remain non-conducting. When circuit breaker 29 is moved to the closed position, however, switch 80 which is connected thereto by a suitable link 82 pivotally mounted at 83, moves to the open position relative to contact 81 and engages a contact 84 which connects a resistor 85 in series with capacitor 72. Resistor 85 is a bleeder resistor for dissipating the charge on capacitor 72 upon movement of switch 80 into engagement with contact 84. It is obvious that by properly arranging the value of the potential of battery 77, circuit breaker 29 can always be closed when the fairly high negative potential of capacitor 72 is applied to control electrodes 70 of electric discharge valves 34, with the result that these electric discharge valves fire late during the alternating current cycle of the plate voltage thereof so that a relatively low initial direct current potential is applied to the input terminals of the oscillation generator 15. When switch 80 engages contact 84 the charge on capacitor 72 gradually leaks off and the potential of control electrodes or grids 70 becomes more positive so that electric discharge valves 34 are rendered conductive earlier during the cycle of the alternating current plate voltage and the direct current potential across the terminals of the oscillation generator gradually builds up to its normal value. The control circuit described heretofore advances the firing of electric discharge valves 34 more and more following closing of circuit breaker 29 so as to increase the plate voltage or input voltage to oscillation generator 15. Thus oscillation generator 15 is provided with a plate voltage that begins with a very low value and gradually increases toward its maximum value. The induced oscillations in the lengths of solder 14 will thus increase from an initial small value to the normal value and the repulsion forces between the lengths of solder and the inductor or heating coil 10 will increase gradually to avoid any repulsion jolt. This is graphically illustrated by the curve H in Fig. 8 which represents the alternating current plate voltage supplied to the rectifiers 34. The curve $E_{72}$ designates the voltage appearing across capacitor 72 with zero time at the instant that switch 80 moves to close the discharge circuit of capacitor 72 by engaging contact 84. The shaded areas associated with the curve H indicate the periods of time during each half cycle that rectifier tubes 34 are conducting and it is observed that these shaded areas gradually increase so that the plate voltage for the electric discharge valve 16 associated with oscillation generator 15 gradually increases and as a result the current flowing in winding 10 gradually builds up to eliminate the repulsive jolt mentioned above.

When the power to the heating coil or inductor 10 is to be turned off circuit breaker 29 is opened which disconnects the power supplied to the rectifier unit 30 whereby the oscillation generator 15 stops producing high frequency oscillations. From the arrangement described thus far it is obvious that when circuit breaker 29 is opened, arcing will occur at the contacts since full load is being interrupted, with the resultant erosion and deterioration of the circuit breaker contacts. In accordance with the present invention this detrimental condition can be avoided by a feature of the invention which consists of an operational sequence between switch 80 and circuit breaker 29. If, during the opening operation of circuit breaker 29, switch 80 is moved to engage contact 81 before the contacts of the circuit breaker 29 separate, battery 77 will cause capacitor 72 to become charged with the application of negative potential to the control electrodes 70 of electric discharge valve 34. If the sudden application of negative potential to the control electrodes 70 of electric discharge valves 34 causes them to become substantially non-conductive, the only current which must be interrupted by circuit breaker 29, is the magnetizing current of the rectifier transformer comprising windings 31 and 32. Switch 80 is illustrated as being constructed as the head of a bolt 90 which passes through a somewhat enlarged opening 91 in lever 82. A suitable spring 92 biases switch 80 to its uppermost position relative to lever 82. With this arrangement switch 80 is caused to engage contact 81 very early during the circuit opening operation. In addition circuit breaker 29 is provided with spring biased contacts 93 so that the circuit breaker actually interrupts the circuit from source 28 to the rectifier unit 30 late during the circuit opening operation. With this arrangement it is quite obvious that the interrupting duty on circuit breaker or contactor 29 is greatly reduced since the rectifiers 34 essentially function as circuit breakers as far as the main power circuit is concerned, leaving contactor or circuit breaker 29 to interrupt only the magnetizing current for the transformer associated with rectifier unit 30.

In view of the detailed description included above the operation of the control arrangement of Fig. 7 will be obvious and no further discussion is included herewith.

In those cases where the oscillation generator 15 requires that a high direct current voltage be applied to the input terminals thereof, it may be very difficult to obtain grid controlled rectifiers such as the rectifiers 34 in Fig. 7, and in any event the cost thereof may be prohibitive at such very high voltages. In Fig. 9 there is illustrated a modification of the present invention in which the use of grid controlled rectifiers such as 34 of Fig. 7 may be dispensed with, and yet wherein the repulsion jolt effect is completely eliminated in an effective manner. The corresponding parts of Fig. 9 are designated by the same reference numerals as in the preceding figures. In Fig. 9 the rectifier unit 30 and the oscillation generator 15 are illustrated as identical with the corresponding units in Fig. 1.

In order to provide a gradual build-up of the high frequency oscillations in the load or heating coil circuit 10, there is provided in the input circuit to rectifier unit 30, a pair of electric discharge valves 95 and 96. These electric discharge valves are preferably of the type employing an ionizable medium such as a gas or a vapor. Examples of these valves are the thyratron or the ignitron. Each of the electric discharge valves 95 and 96 is provided with an anode 97, a cathode 98 and a control electrode 99. These electric discharge valves 95 and 96 are connected in back-to-back connection in series with the primary winding 31 of the transformer associated with rectifier unit 30. By that is meant that the anode 97 of electric discharge valve 95 is connected to a cathode 98 of electric discharge valve 96. Similarly the anode 97 of electric discharge valve 96 is connected to the cathode 98 of electric discharge valve 95. When these valves are rendered fully conducting a path is provided for both half cycles of the alternating current from source 28 so that the alternating current power reaches the primary winding 31 of the transformer associated with the rectifier unit 30 with little or no voltage drop and the rectifier unit 30 will have a maximum direct current output with the result that the oscillation generator 15 will operate at maximum power output. It is quite obvious that if a particular control potential is applied to the grid or control electrodes 99 of electric discharge valves 95 and 96, the discharge valves 95 and 96 may be rendered conducting at a later point during the alternating current cycle than if no control potential were applied to the control electrodes 99. It is quite obvious that by providing a particular control arrangement for control electrodes or grids 99 of electric discharge valves 95 and 96, the alternating current potential supplied to the rectifier unit 30 may be decreased by virtue of the fact that the tubes 95 and 96 are not rendered conducting during the entire alternating current cycle, and as a result the direct current voltage output of the rectifier unit 30 may be substantially decreased or varied as desired. By advancing the phase of the grid voltages applied to control electrodes 99 relative to the plate voltage the electric discharge valves 95 and 96 can be fired earlier in the cycle than if the phase of the grid voltages were retarded. When this alternating current voltage obtained by advancing the phase of the grid voltages is rectified a greater plate potential is available for electric discharge valve 16 of oscillation generator 15 than in the case where the phase of the grid voltages applied to control electrodes 99 is retarded and oscillations of greater amplitude will result.

In accordance with the present invention automatic means are provided for controlling the phase of the grid potentials applied to control electrodes 99 of electric discharge valves 95 and 96 so that the generation of weak oscillations by oscillation generator 15 at the beginning of the heating period following closure of switch 29 results, which oscillations gradually increase to full magnitude. With this arrangement the repulsion jolt effect discussed above is substantially eliminated.

Control electrode 99 of electric discharge valve 95 is connected to its cathode 98 through a current limiting resistor 100, a bias battery 101 and the secondary winding 102a of a transformer 103 having a primary winding 104. Similarly, the control electrode 99 of electric discharge valve 96 is connected to its cathode 98 through a current limiting resistor 100, a bias battery 101 and the secondary winding 102b of grid transformer 103 having primary winding 104. When primary winding 104 is energized with an alternating current potential corresponding alternating potentials displaced from each other by 180 electrical degrees are impressed on each of the control electrodes 99 of electric discharge valves 95 and 96. Whenever one of these control electrodes is rendered sufficiently positive its associated electric discharge valve is rendered conductive. Valve 95 is rendered conductive during one-half cycle while valve 96 is rendered conductive during the other half cycle.

In order to energize the primary winding 104 of grid transformer 103 with the desired alternating current voltage and with a controllable phase relative to the phase of the alternating current voltage from source 28, there is provided a phase shifting unit generally indicated at 105 which is, in many respects, quite similar to the phase shifting unit 56 of Figs. 1 and 7. The corresponding parts of phase shifting unit 105 are designated by the same reference numerals as the parts of phase shifting unit 56. The bridge circuit made up of inductances 57a and 57b in two arms thereof in Fig. 9 includes in the third arm thereof an inductance 106 and in the fourth arm serially arranged resistances 107 and 108. The resistance 107 is a manually controllable resistance for initial adjustment purposes while the resistance 108, in accordance with the present invention, comprises the filament of an electric lamp, the resistance of which varies greatly with the temperature thereof. The output circuit of the phase shifting unit 105 is between terminals 60 and 63 as in the preceding figures and this output circuit is connected to the terminals of the primary winding 104 of grid transformer 103. The input circuit of phase shifting unit 105 is connected to the alternating current source supplying rectifier unit 30 and is preferably connected thereto on the load side of circuit breaker 29 rather than on the source side as in the preceding figures. With this arrangement when circuit breaker 29 is closed by actuating closing switch 41, phase shifting unit 105 is energized. The cold resistance of incandescent lamp 108 is a small fraction of its hot value so that when the circuit breaker 29 is initially closed the phase of the grid voltage applied to control electrodes 95 is considerably retarded, with the result that the output voltage of rectifier unit 30 is small and the oscillations of oscillation generator 15 are weak. As the filament of the incandescent lamp 108 heats up, its resistance increases, with the gradual advance of the phase of the grid voltage applied to control electrodes 99 whereupon, as will be obvious to those skilled in the art, the output of oscillation generator 15 increases to its maximum desired value.

Figs. 10 and 11 illustrate vectorially the operation of the phase shifting device 105. In Fig. 10 the instantaneous voltages across the arms of the bridge network are illustrated with the appropriate subscript. It should be noted that the voltage $E_{108}$ actually is the total voltage across resistances 107 and 108. The resistance 107 is included solely to make the desired initial adjustment. It is observed that the voltage $E_{104}$ which is the output voltage of the phase shifting unit 105 is considerably retarded from its most advanced position in phase with the phase voltage of the alternating current source 28 represented by voltage vector $E_{57}$. In Fig. 11 the vector relationships for the hot condition of resistor 108 are shown and in this case the voltage $E_{104}$ has a phase position which is considerably advanced and in fact is not far out of phase with the source voltage 28 represented by voltage vector $E_{57}$. This advanced voltage will cause electric discharge valves 95 and 96 to fire much earlier during the alternating current cycle than the voltage $E_{104}$ of Fig. 10. In view of the detailed description included above the operation of the arrangement shown in Fig. 9 will be obvious to those skilled in the art.

It will be obvious that the same results obtained in Fig. 9 can be obtained if, instead of varying the resistance 108 from an initial low value to a higher value, the impedance of inductance 106 is varied. Accordingly in Fig. 12 the phase shifting unit of Fig. 9 is shown, modified to the extent that the incandescent lamp 108 is omitted and instead a phase shifting unit 110 is provided which is substantially identical with the phase shifting unit 56, except that the capacitor leg is eliminated and instead a saturable reactor 111 is employed in this leg. The saturable reactor 111 comprises alternating current windings 112 which are connected between the terminals 63 and 59 of the phase shifting unit 110. The saturable reactor 111 also includes a saturating winding 113 which is connected in series with a suitable source of potential such as the battery 114 through a pair of contacts 115 controlled by suitable switch 116. When the switch 116 is open the reactance of saturable reactor 111 is high, resulting in an output voltage at the terminals 60 and 63 of the phase shifting unit 110 that is advanced, whereas if the switch 116 is closed the saturable reactor 111 is operated above saturation and affords a greatly decreased impedance with a resulting retardation of the phase of the phase shifting output voltage. Preferably switch 116 is closed in response to operation of circuit breaker 29 so that the initial output of oscillation generator 15 is low and is increased upon operation of switch 116 to the closed position. The operation of the arrangement disclosed in Fig. 12 will be obvious by comparing the vector diagrams of Figs. 10 and 11, Fig. 10 illustrating the arrangement when the switch 116 is open and Fig. 11 the arrangement when the switch 116 is closed. The operation of the arrangement disclosed in Fig. 12 will also be obvious in view of the detailed description included above.

While there have been shown and described particular embodiments of the present invention as applied to a high frequency heating apparatus, it is to be understood that the arrangements disclosed are merely illustrative of the invention. It will of course be obvious to those skilled in the art that changes and modifications may be made without departing from the present invention and it is aimed in the appended claims to cover all such changes and modifications as fall within the true spirit and scope of the present invention.

I claim:

1. In a control arrangement for a high frequency heating device of the type for soldering two metal members together by melting a length of solder which has been placed adjacent the members to be soldered, comprising in combination, means for generating high frequency oscillations, a heating coil connected to said means for generating high frequency oscillations and adapted to be inductively coupled with said length of solder, a source of alternating current potential, a control device for controlling the energization of said means for generating high frequency oscillations from said source, and means for causing only a low initial current to flow in said heating coil following operation of said control device to energize said means for generating high frequency oscillations by operating said control device so as to energize said means for generating high frequency oscillations at a predetermined instant with reference to the instantaneous voltage of said alternating current potential whereby any movement of said length of solder due to the inductive effect of said heating coil is eliminated.

2. In a control arrangement for a high frequency heating device of the type for soldering two metal members together by melting a length of solder which has been placed adjacent the members to be soldered, comprising in combination, an oscillation generator for generating high frequency oscillations, a high frequency heating coil connected to said generator and arranged to be inductively coupled with said length of solder, a source of alternating current potential, a rectifier unit connected to the input terminals of said generator, a circuit controlling device for connecting said source to said rectifier unit to energize said generator, a control circuit for said circuit controlling device including an electric discharge valve, means for rendering said electric discharge valve conductive only at a predetermined instant during the cycle of said alternating current source when said circuit controlling device can be operated to cause only a low initial current to flow in said heating coil, whereby any movement of said length of solder due to the inductive effect of said heating coil is eliminated.

3. In a high frequency heating device of the type for soldering two metal members together by melting a length of solder which has been positioned adjacent the joint between the members to be soldered, an oscillation generator for generating high frequency oscillations, a high frequency heating coil connected to said generator and arranged to be inductively coupled with said length of solder, a source of alternating current potential, a circuit controlling device for connecting said source to said generator, a control circuit for said circuit controlling device including an electric discharge valve, and means for rendering said electric discharge valve conductive only at a predetermined instant during the cycle of said alternating current source when said circuit controlling device can be operated to cause only a low initial current to flow in said heating coil, whereby any movement of said length of solder due to the inductive effect of said heating coil is eliminated.

4. In a high frequency heating device of the type for soldering two metal members together by melting a length of solder which has been placed adjacent the joint between the members to be soldered, an oscillation generator for generating high frequency oscillations, a high frequency heating coil connected to said generator and arranged to be inductively coupled with said length of solder, a source of alternating current potential, an electric circuit breaker for connecting said source to said generator, a closing control circuit for said circuit breaker including an electric discharge valve, and means for rendering said electric discharge valve conductive only at a predetermined instant during the cycle of said alternating current source when said circuit breaker can be closed to cause only a low initial current to flow in said heating coil, whereby any movement of said length of solder due to the inductive effect of said heating coil is eliminated.

5. In a high frequency heating device of the type for soldering two metal members together by melting a length of solder which has been placed adjacent the joint between the members to be soldered, a high frequency heating coil for heating the length of solder by inductive coupling therewith, a high frequency oscillation generator connected to supply said heating coil with high frequency oscillations, a source of alternating current potential, a rectifier unit interconnecting said source and said generator for transforming said alternating current potential to direct current potential, a control device for controlling the energization and deenergization of said rectifier unit from said source, a control circuit for said rectifier unit for controlling the magnitude of the direct current voltage supplied to said generator, and means responsive to the operation of said control device to cause said rectifier unit to supply said oscillation generator with a low initial direct current so as to eliminate the repulsion jolt effect of said heater coil on said length of solder upon initial energization of said oscillation generator.

6. In a high frequency induction heating device, a heating coil, an oscillation generator connected to supply said heating coil with high frequency oscillations, a source of alternating current potential, a rectifier unit including a pair of electric discharge valves interconnecting said source and said generator for transforming said alternating current potential to direct current potential, each of said discharge valves having a control electrode, a circuit breaker connected between said rectifier unit and said source, a control circuit for said discharge valve for controlling the magnitude of the direct current voltage supplied to said generator, a capacitor in said control circuit, means for charging said capacitor with a direct current potential when said circuit breaker is in the open position so as to apply a negative potential to said control electrodes, a bleeder circuit for dissipating the energy stored in said capacitor, and means responsive to the closing of said circuit breaker for connecting said bleeder circuit across said capacitor.

7. In a high frequency induction heating device, a heating coil, an oscillation generator connected to supply said heating coil with high frequency oscillations, a source of alternating current potential, a plurality of electric discharge valves each provided with a control electrode, means connecting said electric discharge valves between said source and said generator for transforming said alternating current potential to direct current potential, a circuit breaker for controlling the alternating current potential supplied from said source to said discharge valves, a control circuit for said control electrodes for varying the conductivity of said electric discharge valves and consequently varying the magnitude of the direct current voltage supplied to said generator, a capacitor in said control circuit, means responsive to the opening of said circuit breaker for charging said capacitor with a direct current potential to bias the control electrodes of said electric discharge valves so as to retard the instant during the cycle of the alternating current potential of said source that said discharge valves are rendered conductive, and means responsive to the closing of said circuit breaker for causing said capacitor to discharge and gradually advance the instant during the cycle of said alternating current of said source that said discharge valves are rendered conductive.

8. In a high frequency heating device of the type for soldering two metal members together by melting a length of solder which has been placed adjacent the joint between the members to be soldered, a heating coil for heating the length of solder by inductive coupling therewith, an oscillation generator connected to supply said heating coil with high frequency oscillations, a source of alternating current potential, a rectifier unit including a pair of electric discharge valves interconnecting said source and said generator for transforming said alternating current potential to direct current potential, each of said discharge valves having a control electrode, a circuit breaker connected between said rectifier unit and said source, a control circuit for said discharge valve connected to said control electrodes for controlling the magnitude of the direct current voltage supplied to said generator, a capacitor in said control circuit, a charging circuit for charging said capacitor with a direct current potential when said circuit breaker is in the open position so as to apply a negative potential to said control electrodes, a bleeder circuit for dissipating the energy stored in said capacitor, means responsive to the closing of said circuit breaker for opening said charging circuit and connecting said bleeder circuit across said capacitor, and means for reclosing said charging circuit during the opening operation of said circuit breaker before the contacts of said circuit breaker separate.

9. In a high frequency induction heating device, a heating coil, an oscillation generator connected to supply said heating coil with high frequency oscillations, a source of alternating current potential, a rectifier unit including a pair of electric discharge valves interconnecting said source and said generator for transforming said alternating current potential to direct current potential, each of said discharge valves having a control electrode, a circuit breaker connected between said rectifier unit and said source, a control circuit for the control electrodes of said discharge valves for controlling the magnitude of the direct current voltage supplied to said generator, a capacitor in said control circuit, a charging circuit for charging said capacitor with a direct current potential when said circuit breaker is in the open position so as to apply a negative potential to said control electrodes, a bleeder circuit for dissipating the energy stored in said capacitor, means responsive to the closing of said circuit breaker for interrupting said charging circuit and connecting said bleeder circuit across said capacitor whereby the charge on said capacitor gradually leaks off and the direct current voltage supplied to said generator gradually increases, and means for opening the contacts of said circuit breaker and completing said charging circuit for said capacitor in a predetermined sequence.

10. In a high frequency induction heating device, a heating coil, an oscillation generator connected to supply said heating coil with high frequency oscillations, a source of alternating current potential, a plurality of electric discharge valves each provided with a control electrode, means connecting said electric discharge valves between said source and said generator for transforming said alternating current potential to direct current potential, a circuit breaker for controlling the supply of alternating current potential from said source to said discharge valves, a control circuit for said control electrodes for varying the conductivity of said electric discharge valves and consequently varying the magnitude of the direct current voltage supplied to said generator, a capacitor in said control circuit, a direct current charging circuit for said capacitor, means responsive to the opening of said circuit breaker for closing said charging circuit to charge said capacitor and bias the control electrodes of said electric discharge valves so as to retard the instant during the cycle of the alternating current potential of said source that said discharge valves are rendered conductive, means responsive to the closing of said circuit breaker for opening said charging circuit to cause said capacitor to discharge and advance the instant during the cycle of said alternating current of said source that said discharge valves are rendered conductive, and means for reclosing said charging circuit during the opening operation of said circuit breaker before the contacts of said circuit breaker separate.

11. In a high frequency induction heating device, a heating coil, an oscillation generator connected to supply said heating coil with high frequency oscillations, a source of alternating current potential, a plurality of electric discharge valves each provided with a control electrode, means connecting said electric discharge valves between said source and said generator for transforming said alternating current potential to direct current potential, a circuit breaker for controlling the supply of alternating current potential from said source to said discharge valves, a control circuit for said control electrodes for varying the conductivity of said electric discharge valves and consequently varying the magnitude of the direct current voltage supplied to said generator, a capacitor in said control circuit, a direct current charging circuit for said capacitor, means responsive to the opening of said circuit breaker for connecting said charging circuit to charge said capacitor and bias said control electrodes so as to retard the instant during the cycle of the alternating current potential of said source that said discharge valves are rendered conductive, and means responsive to the closing of said circuit breaker for disconnecting said capacitor from said charging circuit and connecting it in a discharge circuit to dissipate the charge thereon and advance the instant during the cycle of said alternating current of said source that said discharge valves are rendered conductive.

12. In a high frequency induction heating device, a heating coil, an oscillation generator connected to supply said heating coil with high frequency oscillations, a source of alternating current potential, a plurality of electric discharge valves each provided with a control electrode, means connecting said electric discharge valves between said source and said generator for transforming said alternating current potential to direct current potential, a circuit breaker for controlling the supply of alternating current potential from said source to said discharge valves, a control circuit for said control electrodes for varying the conductivity of said electric discharge valves and consequently varying the magnitude of the direct current voltage supplied to said generator, a capacitor in said control circuit, a direct current charging circuit for said capacitor, means responsive to the opening of said circuit breaker for connecting said charging circuit to charge said capacitor and bias said control electrodes so as to retard the instant during the cycle of the alternating current potential of said source that said discharge valves are rendered conductive, means responsive to the closing of said circuit breaker for disconnecting said capacitor from said charging circuit and connecting it in a discharge circuit to dissipate the charge thereon and advance the instant during the cycle of said alternating current of said source that said discharge valves are rendered conductive, and means for reconnecting said charging circuit to charge said capacitor during the opening operation of said circuit breaker before the contacts of said circuit breaker separate to reduce the interrupting requirement of said circuit breaker.

13. In a high frequency heating device of the type for soldering two metal members together by melting a length of solder which has been placed adjacent the joint between the members to be soldered, a load circuit comprising an oscillation generator for generating high frequency oscillations and a high frequency heating coil connected to said generator and arranged to be inductively coupled with said length of solder, a source of alternating current potential, an electric circuit breaker for connecting said source to said load circuit, a pair of electric discharge valves arranged in back-to-back connection in series with said load circuit, and a control circuit for said electric discharge valves including an impedance bridge type phase shifting unit connected to said source so that the conductivity of said electric discharge valves may be varied by varying the impedance of one element of said phase shifting unit, and means for varying the impedance of said one element in response to operation of said circuit breaker to connect said source to said load circuit so that the current supplied to said load circuit has a low initial value gradually increasing to a normal value as the impedance of said element varies.

14. In a high frequency induction heating device, a heating coil, an oscillation generator connected to supply said heating coil with high frequency oscillations, a supply circuit comprising a source of alternating current potential, a rectifier unit interconnecting said source and said generator for transforming said alternating current potential to direct current potential, said rectifier unit, oscillation generator and heating coil comprising a load circuit, a circuit breaker connected between said load and supply circuits, a pair of electric discharge valves connected in back-to-back relationship and in series with said load circuit, a control circuit for said electric discharge valves including an impedance bridge type phase shifting unit connected to said supply circuit, one element of said impedance bridge type phase shifting unit comprising a resistance in the form of an incandescent lamp the resistance of which increases with increase in temperature by virtue of current flowing therethrough, and means for energizing said control circuit upon operation of said circuit controlling device to interconnect said load and supply circuits so that the current supplied to said load circuit has a low initial value gradually increasing to a normal value as the resistance of said element increases with temperature.

15. In a control arrangement for controlling the current supplied between two circuits comprising a direct current load circuit, an alternating current supply circuit, a plurality of electric discharge valves each provided with a control electrode interconnecting said load and supply circuits, a circuit breaker for controlling the supply of alternating current potential from said supply circuit to said discharge valves, a control circuit for said control electrodes for varying the conductivity of said electric discharge valves and consequently varying the magnitude of the direct current voltage of said load circuit, a capacitor in said control circuit, a direct current charging circuit for said capacitor, means responsive to the opening of said circuit breaker for closing said charging circuit to charge said capacitor with a voltage to bias the control electrodes of said electric discharge valves so as to retard the instant during the cycle of the alternating current potential of said source that said discharge valves are rendered conductive, and means responsive to the closing of said circuit breaker for opening said charging circuit to cause said capacitor to discharge and advance the instant during the cycle of said alternating current of said source that said discharge valves are rendered conductive.

16. In a control arrangement for controlling the current supplied between two circuits comprising, a direct current load circuit, an alternating current supply circuit, a plurality of electric discharge valves each provided with a control electrode interconnecting said load and supply circuits, a circuit breaker for controlling the supply of alternating current potential from said supply circuit to said discharge valves, a control circuit for said control electrodes for varying the conductivity of said electric discharge valves and consequently varying the magnitude of the direct current voltage of said load circuit, a capacitor in said control circuit, a direct current charging circuit for said capacitor, means responsive to the opening of said circuit breaker for closing said charging circuit to charge said capacitor with a voltage to bias the control electrodes of said electric discharge valves so as to retard the instant during the cycle of the alternating current potential of said source that said discharge valves are rendered conductive, means responsive to the closing of said circuit breaker for opening said charging circuit to cause said capacitor to discharge and advance the instant during the cycle of said alternating current of said source that said discharge valves are rendered conductive, and means for reclosing said charging circuit during the opening operation of said circuit breaker before the contacts of said circuit breaker separate.

HERBERT F. STORM.

REFERENCES CITED

The following references are of record in the file of this patent:

UNITED STATES PATENTS

| Number | Name | Date |
|---|---|---|
| 400,978 | Watts | Apr. 9, 1889 |
| 402,416 | Dewey | Apr. 30, 1889 |
| 1,930,452 | Brown | Oct. 10, 1933 |
| 1,993,961 | Groven et al. | Mar. 12, 1935 |
| 2,078,152 | Moyer | Apr. 20, 1937 |
| 2,205,424 | Leonard | June 25, 1940 |
| 2,243,833 | Bohn | June 3, 1941 |
| 2,251,277 | Hart et al. | Aug. 5, 1941 |
| 2,293,851 | Rogers | Aug. 25, 1942 |
| 2,324,525 | Mittelmann | July 20, 1943 |
| 2,385,904 | Witty | Oct. 2, 1945 |
| 2,415,799 | Reifel et al. | Feb. 11, 1947 |